(12) United States Patent
Hsieh

(10) Patent No.: US 7,592,913 B2
(45) Date of Patent: Sep. 22, 2009

(54) WIRELESS AV LIGHTING FIXTURE WITH AUTO SENSOR

(75) Inventor: Chin-Mu Hsieh, No. 5, Lane 93, Gong Yuan Rd., Yang Kang City, Tainan Hsien (TW)

(73) Assignee: Chin-Mu Hsieh, Tainan Hsien (TW)

( * ) Notice: Subject to any disclaimer, the term of this patent is extended or adjusted under 35 U.S.C. 154(b) by 346 days.

(21) Appl. No.: 11/626,618

(22) Filed: Jan. 24, 2007

(65) Prior Publication Data
US 2008/0174985 A1    Jul. 24, 2008

(51) Int. Cl.
*G08B 13/00* (2006.01)
(52) U.S. Cl. .............. 340/541; 340/540; 340/545.3; 340/555; 340/539.26; 307/117
(58) Field of Classification Search ............ 340/539.26, 340/540, 541, 545.3, 539.1, 555–557, 565, 340/693.11; 362/6, 20; 315/134, 82, 308, 315/130; 307/117, 116
See application file for complete search history.

(56) References Cited

U.S. PATENT DOCUMENTS

| 6,404,079 | B1 * | 6/2002 | Hsieh .................... 307/117 |
| 6,433,683 | B1 * | 8/2002 | Robinson ................ 340/540 |
| 7,319,378 | B1 * | 1/2008 | Thompson et al. ....... 340/426.1 |
| 7,327,253 | B2 * | 2/2008 | Whitten et al. ........... 340/541 |
| 7,339,607 | B2 * | 3/2008 | Damabhorn ............. 348/143 |

* cited by examiner

*Primary Examiner*—Anh V La
(74) *Attorney, Agent, or Firm*—WPAT., P.C.; Justin King

(57) ABSTRACT

A wireless AV lighting fixture with automatic sensor includes a sensor, a light-emitting device, a camera, a connection port, a wireless remote-controlled unit, and a memory. The sensor is a passive infrared sensor. All of the light-emitting device, the camera, and the connection port are connected to the sensor. The wireless remote-controlled unit includes a transmitter and a receiver. The transmitter is connected to the sensor and transmits telecommunication signals to the receiver. The memory is connected to the sensor.

2 Claims, 4 Drawing Sheets

WIRELESS AV LIGHTING FIXTURE WITH AUTO SENSOR

BACKGROUND OF THE INVENTION (a) Field of the Invention

The present invention relates to a lighting fixture with auto sensor, and more particularly, to one for wireless AV shooting and recording including a light-emitting device and a camera that move along with a sensor synchronously real-time tracking a person or an object to retrieve images, and a memory may be separately connected to the sensor.

(b) Description of the Prior Art

An invention of M273917 titled "Light Emitting Device with Sensor Function" published in ROC Gazette includes a light shell, a sensor module, a light holder, and a starter. The light shell is provided with a through hole and an annular portion extending from the light shell. The sensor module is disposed in the annular portion. The light holder is incorporated in the through hole. The light holder and the sensor module are connected to the starter. The sensor module detects movement of a person or an object and a signal is transmitted to control the starter to turn on/off a light bulb.

However, the sensor module covers only one-way sensing area and is not capable of tracing to emit light on a moving person or an object within its sensing area, or retrieving the image picked up by the sensor for transmitting the image to a memory unit for storage.

SUMMARY OF THE INVENTION

The primary purpose of the present invention is to provide a lighting fixture adapted with an automatic sensor for wireless AV shooting and recording as a solution to the prior art that fails to retrieve of AV signals and storage them in a memory.

To achieve the purpose, the present invention includes a sensor, i.e., a passive infrared sensor, a light-emitting device disposed on the sensor, a camera connected to the sensor, a connection port connected to the sensor, a wireless remote-controlled unit having a transmitter and a receiver with the transmitter connected to the sensor and sending telecommunication signals to the receiver, and a memory connected to the sensor. The sensor comprises a tuner and at least one section of sensing interval. The memory is fixedly connected to the sensor. The memory may be separately connected to the sensor.

Alternatively, the present invention may include a sensor related to a passive infrared sensor, a light-emitting device disposed on the sensor, a camera connected to the sensor, a connection port connected to the sensor, an AV (audio/video) wireless unit having a transmitter and a receiver with the transmitter connected to the sensor and sending telecommunication signals to the receiver, a wireless remote-controlled unit having a transmitter and a receiver with the transmitter connected to the sensor and sending telecommunication signals to the receiver, and a memory connected to the sensor. The sensor comprises a tuner and at least one section of sensing interval. The memory is fixedly connected to the receiver of the AV wireless unit. The memory may be separately connected to the sensor.

As the light-emitting device and the camera move around by following the sensor within the sensing interval, the light-emitting device provides lighting to a person or an object moving at any angle with the sensing interval thus to minimize the dead angle for shooting while synchronously retrieving real-time camera images. The memory stores AV signals retrieved by timeframe. Furthermore, the memory is separately connected to the sensor to prevent the memory and/or the lighting fixture from being stolen or damaged.

DETAILED DESCRIPTION OF THE PREFERRED EMBODIMENTS

Figure 1:
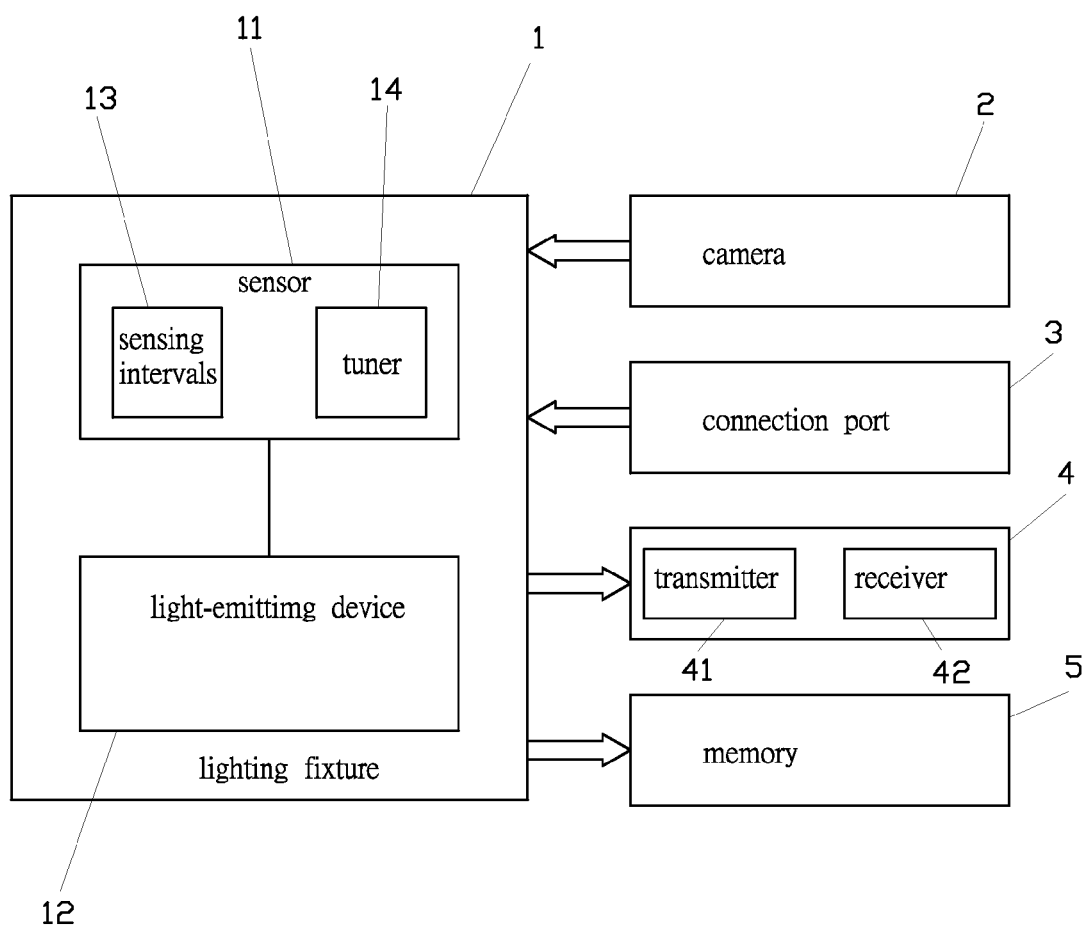
FIG. 1 is a block chart of a first preferred embodiment of the present invention.

Referring to FIG. 1, a first preferred embodiment of the present invention includes a lighting fixture (1), a camera (2), a connection port (3), a wireless remote-controlled unit (4), and a memory (5).

The lighting fixture (1) comprises a sensor (11) and a light-emitting device (12). The sensor (11) is a passive infrared sensor (PIR). The light-emitting device (12) is disposed on the sensor (11). The sensor (11) is provided with three sections of sensing intervals (13) (a left interval, a middle interval, a right interval) and a tuner (14). The tuner (14) offers options of luminance [LUX], time [TIME], and sensitivity [SENSI]. Option [LUX] is provided for adjusting an operation point of the luminance of the natural light on the sensor (11); option [TIME] is provided for adjusting the length of time of sensor luminance; and option [SENSI] is provided for adjusting the scope of sensitivity of the sensing intervals (13). The light-emitting device (12) turns around by following the sensor (11) in corresponding to a person or an object moving within the sensing intervals (13) to execute real-time tracking and lighting the person or the object. Furthermore, the light-emitting device (12) may be fixedly connected to the sensor (11).

The camera (2) is connected to the sensor (11) of the lighting fixture (1) to record images of the person or the object corresponding to the sensor (11) within the sensing intervals (13).

The connection port (3) is connected to the sensor (11) of the lighting fixture (1). The connection port (3) may be USB (Universal Serial Bus) or IEEE1394 (i.e., No. 1394 Firewire high speed serial communication port specified by Institute of Electrical and Electronics Engineers, Inc (IEEE) in 1995).

The wireless remote-controlled unit (4) comprises a transmitter (41) and a receiver (42). The transmitter (41) is connected to the sensor (11) and sends telecommunication signals to the receiver (42).

The memory (5) is provided with options OFF, AUTO, and ON. Option OFF is to disable video-recording of the memory (5); option AUTO (AUTOMATIC), to operate as controlled by the sensor (11); and option ON, to continue operating without being subject to the control by the sensor (11). The memory (5) may be a SD card (Secure Digital Card), a CF card (Compact Hash Card), a MMC card (MultiMedia Card), or a MS card (Memory Stick Card) for presetting video recording time and storage. The memory (5) may be fixedly or separately connected to the sensor (11).

Figure 2:
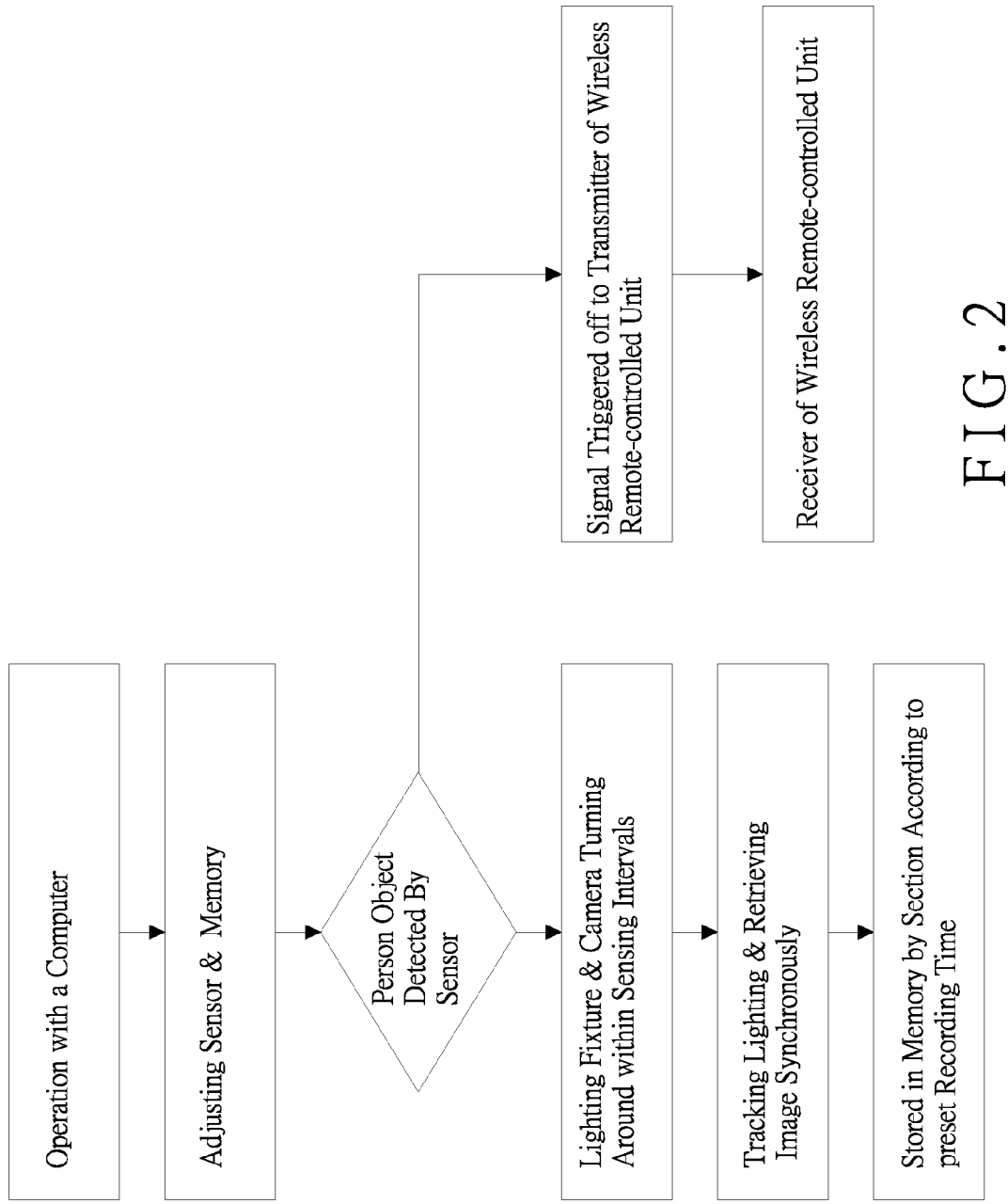
FIG. 2 is a working flow chart of the first preferred embodiment of the present invention.

In operation as illustrated in FIGS. 1 and 2, a computer is connected to the connection port (3) and time and date are keyed into the computer, followed with adjustment of settings of operation point, light-on time and sensitivity of the sensor (11), and operation options of the memory (5). In this preferred embodiment, the memory (5) operation option is set to the AUTO mode. When the sensor (11) detects a moving person or an object within its sensing intervals (13), the light-emitting device (12) turns on to turn around with the camera (2) within the corresponding sensing interval (13) to make sure of no dead corner for shooting while transmitting to the computer those images of the person or the object detected within the sensing interval (13) retrieved, and all those images retrieved are stored in the memory (5) by timeframe according to the preset time for video recording. To prevent the lighting fixture (1) and/or the memory (5) from being stolen or damaged, the memory (5) and the lighting fixture (1) are separately provided.

The sensor (11) further triggers off a signal to the transmitter (41) of the wireless remote-controlled unit (4), where a telecommunication signal is transmitted to the receiver (42) of the wireless remote-controlled unit (4) and the signal received by the receiver (42) is passed to an electric appliance, e.g., an alarm or an electric light to alert or inform. Necessary software may be adapted to view through the connection port (3) those currently retrieved images by the camera (2).

Figure 3:
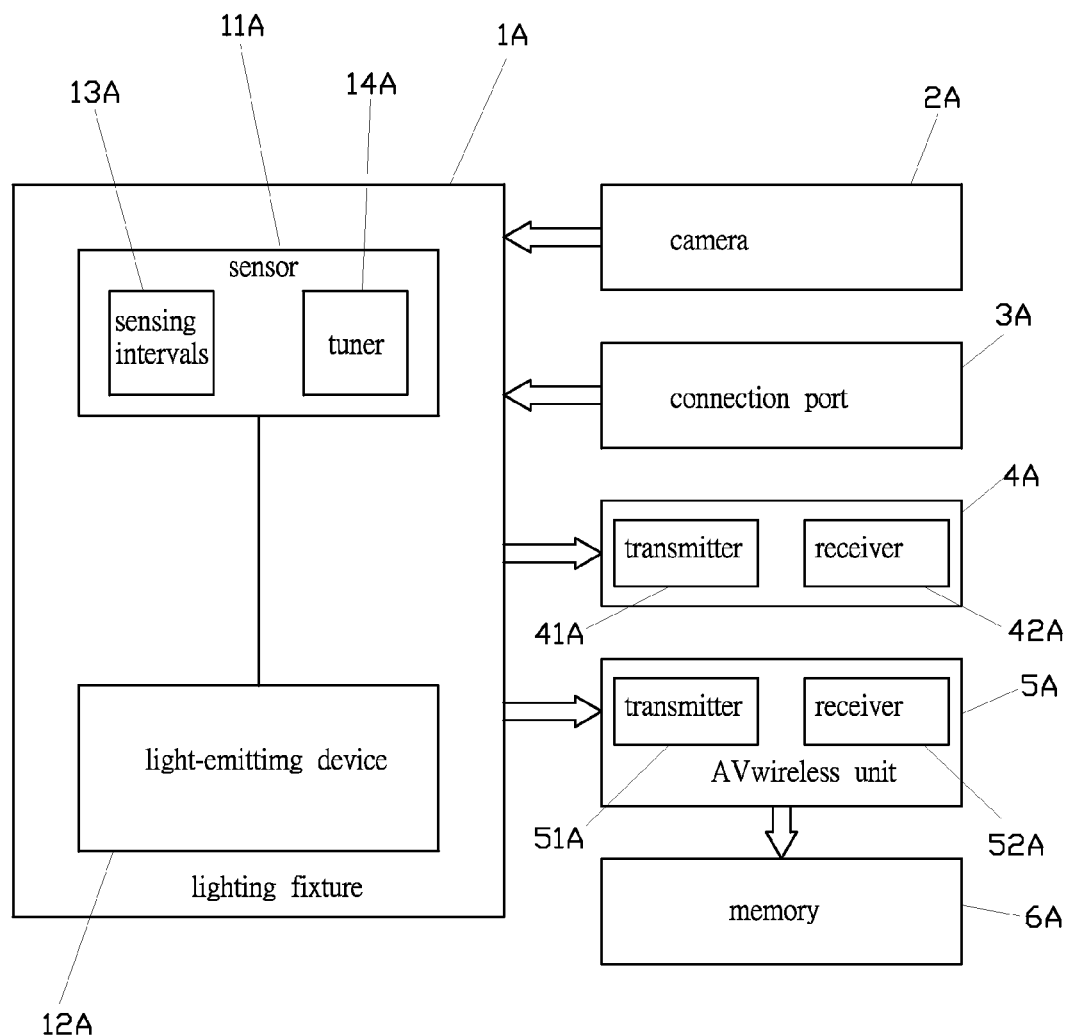
FIG. 3 is a block chart of a second preferred embodiment of the present invention.

As illustrated in FIG. 3, a second preferred embodiment of the present invention comprises a lighting fixture (1A), a camera (2A), a connection port (3A), a wireless remote-controlled unit (4A), an AV (audio/video) wireless unit (5A), and a memory (6A). The lighting fixture (1A) comprises a sensor (11A) and a light-emitting device (12A). The sensor (11A) comprises sensing intervals (13A) and a tuner (14A). The wireless remote-controlled unit (4A) comprises a transmitter (41A) and a receiver (42A). The lighting fixture (1A), the camera (2A), the connection port (3A), the wireless remote-controlled unit (4A), and the memory (6A) are the same as that provided in the first preferred embodiment of the present invention as illustrated in FIGS. 1 and 2; therefore they will not be elaborated herein.

The AV wireless unit (5A) comprises a transmitter (51A) and a receiver (52A). The transmitter (51A) is connected to the sensor (11A) to transmit AV signals to the receiver (52A).

The memory (6A) may be fixedly connected to the receiver (52A) of the AV wireless unit (5A) or separately connected to the sensor (11A).

Figure 4:
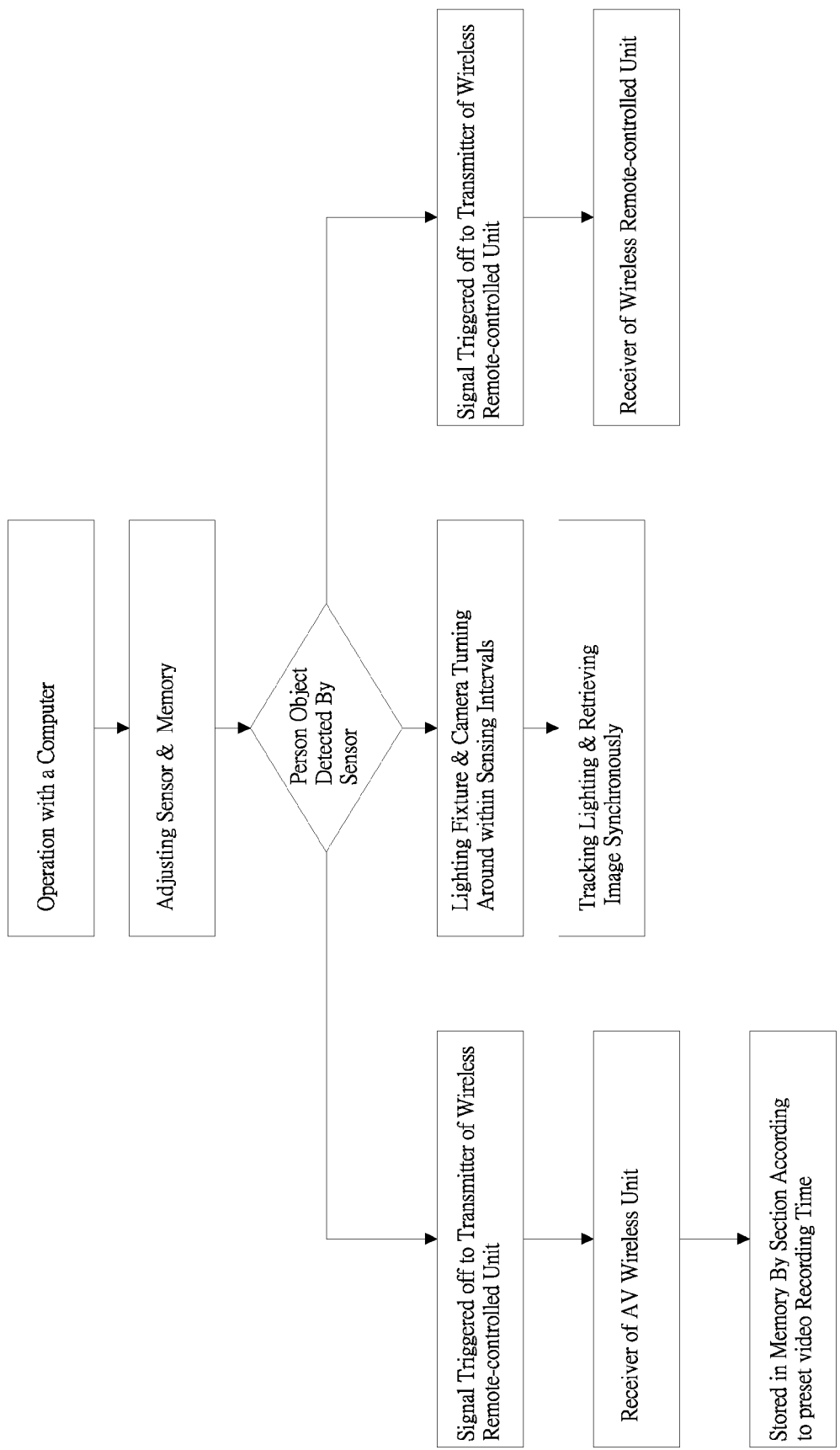
FIG. 4 is a working flow chart of the second preferred embodiment of the present invention.

As illustrated in FIGS. 3 and 4, the operation is generally the same as that of the first preferred embodiment and differs form the first preferred embodiment in that the sensor (11A) separately triggers off a signal to the transmitter (51A) of the AV wireless unit (5A), where AV signals having been completed with operation process are transmitted by section to the receiver (52A) and then stored in the memory (6A) connected with the receiver (52A); or alternatively, signals of film received by the receiver (52A) of the AV wireless unit (5A) are transmitted to an electric appliance, e.g., a TV set for real-time view.

What is claimed is:

1. A wireless AV (audio/video) lighting fixture with automatic sensor, comprising:
   a sensor, the sensor being a passive infrared sensor;
   a light-emitting device disposed on the sensor;
   a camera connected to the sensor;
   a connection port connected to the sensor;
   a wireless remote-controlled unit comprising a transmitter and a receiver, the transmitter being connected to the sensor and transmitting telecommunication signals to the receiver; and
   a memory connected to the sensor,
   wherein the sensor comprises a tuner and at least one section of sensing interval and wherein the memory is separately connected to the sensor.

2. A wireless AV (audio/video) lighting fixture with automatic sensor, comprising:
   a sensor, the sensor being a passive infrared sensor;
   a light-emitting device disposed on the sensor;
   a camera connected to the sensor;
   a connection port connected to the sensor,
   an AV (audio/video) wireless unit comprising a transmitter and a receiver, the transmitter being connected to the sensor and transmitting AV signals to the receiver;
   a wireless remote-controlled unit comprising a transmitter and a receiver, the transmitter being connected to the sensor and transmitting telecommunication signals to the receiver; and
   a memory connected to the sensor,
   wherein the sensor comprises a tuner and at least one section of sensing interval and wherein the memory is separately connected to the sensor.

* * * * *